(12) United States Patent
Wargon (10) Patent No.: US 11,943,568 B1
(45) Date of Patent: Mar. 26, 2024

(54) SYSTEMS AND METHODS FOR PROVIDING REMOTE INTERACTIVE VISITS IN CEMETERIES

(71) Applicant: Jeffrey Wargon, Scottsdale, AZ (US)

(72) Inventor: Jeffrey Wargon, Scottsdale, AZ (US)

(*) Notice: Subject to any disclaimer, the term of this patent is extended or adjusted under 35 U.S.C. 154(b) by 0 days.

(21) Appl. No.: 18/300,309

(22) Filed: Apr. 13, 2023

Related U.S. Application Data (60) Provisional application No. 63/330,880, filed on Apr. 14, 2022.

(51) Int. Cl.
| | | |
|---|---|---|
| *H04N 7/18* | (2006.01) | |
| *B64D 47/02* | (2006.01) | |
| *B64U 10/00* | (2023.01) | |
| *B64U 101/30* | (2023.01) | |
| *G06V 20/56* | (2022.01) | |

(52) U.S. Cl.
CPC ............ *H04N 7/185* (2013.01); *B64D 47/02* (2013.01); *B64U 10/00* (2023.01); *B64U 2101/30* (2023.01); *B64U 2201/10* (2023.01); *G06V 20/56* (2022.01)

(58) Field of Classification Search
CPC .... H04N 7/185; B64U 10/00; B64U 2201/10; B64U 2101/30; B64D 47/02; G06V 20/56
USPC ....................................................... 348/144
See application file for complete search history.

(56) References Cited

U.S. PATENT DOCUMENTS

| | | | |
|---|---|---|---|
| 9,987,184 B2 | 6/2018 | Borovinov | |
| 11,368,351 B1* | 6/2022 | Hollis | H04N 21/21805 |
| 11,405,657 B1* | 8/2022 | Perumalla | A63F 13/497 |
| 2014/0218519 A1* | 8/2014 | Borovinov | H04N 23/00 27/1 |
| 2015/0120094 A1* | 4/2015 | Kimchi | G06Q 10/083 701/3 |
| 2017/0205827 A1* | 7/2017 | Rezvani | G05D 1/02 |
| 2019/0066485 A1* | 2/2019 | Roberts | G08B 13/1965 |
| 2019/0236366 A1* | 8/2019 | Mangum | H04W 4/023 |
| 2020/0004320 A1* | 1/2020 | Leppanen | G06F 3/041 |
| 2020/0260297 A1* | 8/2020 | Priest | B64C 39/024 |
| 2022/0044574 A1* | 2/2022 | Chow | G08G 5/0034 |
| 2022/0207460 A1* | 6/2022 | Ngo | G06V 30/18 |

* cited by examiner

*Primary Examiner* — Matthew David Kim
(74) *Attorney, Agent, or Firm* — L C Begin & Associates, PLLC (57) ABSTRACT

Implementations of a system for facilitating a virtual visit to a gravesite may include a drone including a video camera, a microphone, and a speaker; and a control system associated with a cemetery. The control system may be configured to receive, from a computing device associated with a user, a request for a virtual visit to a gravesite, calculate a travel path for the drone to the gravesite from a base location located at the cemetery; initiate autonomous travel by the drone along the travel path; confirm arrival of the drone; while at the gravesite, transmit video and audio of the gravesite from the camera and microphone of the drone to the computing device associated with the user using the telecommunication channel; while at the gravesite, transmit audio from the computing device associated with the user from the speaker of the drone; and return the drone to the base location.

22 Claims, 8 Drawing Sheets

SYSTEMS AND METHODS FOR PROVIDING REMOTE INTERACTIVE VISITS IN CEMETERIES

CROSS REFERENCE TO RELATED APPLICATIONS

This document claims the benefit of the filing date of U.S. Provisional Patent Application 63/330,880, entitled "Interactive Session" to Jeffrey Wargon which was filed on Apr. 14, 2022, the disclosure of which is hereby incorporated entirely herein by reference.

BACKGROUND

1. Technical Field

Aspects of this document relate generally to drone systems, such as drones for use in visiting specific physical locations. More specific implementations involve drones used to visit physical locations in cemeteries.

2. Background

Cemeteries are designated areas of land that contain various gravesites for deceased individuals and pets. Some cemeteries are professionally managed while others are informal plots on land previously inhabited by a family or community. Some cemeteries are located adjacent to a house of worship.

SUMMARY

Implementations of a system for facilitating a virtual visit to a gravesite may include a drone including a video camera, a microphone, and a speaker; and a control system associated with a cemetery, the control system including one or more processors and a telecommunication channel configured to: receive, from a computing device associated with a user, a request for a virtual visit to a gravesite. The system may further include a control system configured to calculate a travel path for the drone to the gravesite from a base location located at the cemetery; initiate autonomous travel by the drone along the travel path to the gravesite; confirm arrival of the drone at the gravesite; while at the gravesite, transmit video and audio of the gravesite from the camera and microphone of the drone to the computing device associated with the user using the telecommunication channel; while at the gravesite, transmit audio from the computing device associated with the user from the speaker of the drone; and return the drone to the base location.

Implementations of a system for facilitating a virtual visit to a gravesite may include one, all, or any of the following:

The drone may be one of an aerial vehicle or a land vehicle.

The drone further may include a projector device configured to display one or more images onto the gravesite.

The drone further may include an illumination device configured to illuminate the gravesite.

The drone further may include a privacy sensor configured to detect the presence of one or more humans within a predetermined area around the gravesite.

The control system and computing device associated with the user may be configured to allow the user to adjust a position of the drone relative to the gravesite after arrival of the drone at the gravesite.

The drone may include a grave stone image recognition system including at least one camera configured to receive and process images of one or more gravestones at the gravesite/cemetery.

The drone may include a navigational system that may include one of a global positioning sensor (GPS), a geofencing sensor, a height sensor, a homing sensor detector, other types of navigational sensors, or any combination thereof.

The drone may include a transporting module configured to transport an object to the gravesite during autonomous travel and leave the object at the gravesite after arrival at the gravesite.

The drone further may include an obstacle avoidance sensor.

Implementations of a system for facilitating a virtual visit to a gravesite may include one of an aerial drone or a land-based drone, the aerial drone or land-based drone including a video camera, a microphone, a speaker, an obstacle avoidance sensor, and a global positioning sensor. The system may include a base station located at a cemetery and including a control system, the control system including one or more processors configured to use one or more telecommunications channels to: receive, from a computing device associated with a user, a request for a virtual visit to a gravesite. The control system may be further configured to calculate a travel path for the aerial drone or land-based drone to the gravesite from a base location located at the cemetery; initiate autonomous travel by the aerial drone or land-based drone along the travel path to the gravesite; confirm arrival of the aerial drone or land-based drone at the gravesite using the global positioning sensor (or other navigational sensors); and while at the gravesite, transmit video and audio of the gravesite from the camera and microphone of the aerial drone or land-based drone to the computing device associated with the user using the telecommunication channel. The control system may be further configured to, while at the gravesite, transmit audio from the computing device associated with the user from the speaker of the aerial drone or land-based drone; avoid obstacles at the gravesite and during the travel path using the obstacle avoidance sensor; and return the aerial drone or land-base drone to the base location.

Implementations of a system for facilitating a virtual visit to a gravesite may include one, all, or any of the following:

The aerial drone or land-based drone further may include a projector device configured to display one or more images onto the gravesite.

The aerial drone or land-based drone further may include an illumination device configured to illuminate the gravesite.

The aerial drone or land-based drone further may include a privacy sensor configured to detect the presence of one or more humans within a predetermined area around the gravesite.

The control system and computing device associated with the user may be configured to allow the user to adjust a position of the aerial drone or land-based relative to the gravesite after arrival of the aerial drone or land-based drone at the gravesite/cemetery.

The aerial drone or land-based drone may include a grave stone image recognition system including at least one camera configured to receive and process images of one or more gravestones at the gravesite which may be used for navigation or other purposes.

Implementations of a method for facilitating a virtual visit to a gravesite may include providing a drone including a video camera, a microphone, and a speaker and a control system associated with a cemetery, the control system including one or more processors and operatively coupled with one or more telecommunication channels. The method may include receiving, at the control system, from a computing device associated with a user, a request for a virtual visit to a gravesite; calculating, using the control system, a travel path for the drone to the gravesite from a base station located at the cemetery; initiating autonomous travel by the drone from the base station along the travel path to the gravesite; and confirming, using the control system, arrival of the drone at the gravesite. The method also may include, while at the gravesite, receiving at one of the base station or the control system over the one or more telecommunication channels video and audio of the gravesite from the camera and microphone of the drone; while at the gravesite, transmitting the video and audio of the gravesite to the computing device associated with the user using the one or more telecommunication channels; and receiving, at the control system, user audio from the computing device associated with the user. The method may also include sending, using the control station, the user audio to the drone using the one or more telecommunication channels; playing the user audio using the speaker of the drone at the gravesite; and returning the drone to the base station.

Implementations of a method for facilitating a virtual visit to a gravesite may include one, all, or any of the following:

Returning the drone to the base station further may include using the control system to calculate a return travel path for the drone from the gravesite to the base station; and initiating autonomous travel by the drone from the base station along the return travel path from the gravesite.

The method may include projecting an image on the gravesite using a projector device included in the drone.

The method may include detecting, using a privacy sensor included in the drone, a presence of one or more humans within a predetermined area around the gravesite.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended systems and methods for facilitating a virtual visit to a gravesite will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such systems and methods for facilitating virtual visits to gravesites, and implementing components and methods, consistent with the intended operation and methods.

In the field of personal bereavement, when a grieving person desires to visit their deceased loved one, they physically travel to the gravesite or memorial site where they can view the grave, hear the ambient sounds in the environment, and converse with the departed by speaking towards the burial site. The only way to implement this method of visitation is that the grieving person is required to be physically present at the gravesite, which is not always possible or practical due to reasons such as adverse health, inclement weather conditions, cemetery operating hours, and long travel distances.

Various systems and methods disclosed herein utilize aerial and/or land-based drones to allow users to conduct virtual visits to a gravesite or gravesites in one or more cemeteries. As used herein, the term "gravesite" includes all types of systems for housing human or animal remains including, by non-limiting example, mausoleums, burial plots, burial sites, memorials, crypts, vaults, urns, columbariums, graves, caves, or any other fixed physical location for interring or storing human or animal remains. As used herein, the term "drone" refers to any autonomously or remotely controllable vehicle capable of traveling in the air, land, and/or water that does not physically carry a human operator including, by non-limiting example, unmanned aerial vehicles, quadcopters, hexacopters, rovers, bipedal robots, quadrupedal robots, wheeled vehicles, tracked vehicles, treaded vehicles, boats, or any other unmanned autonomously or remotely controllable vehicle type.

Figure 1:
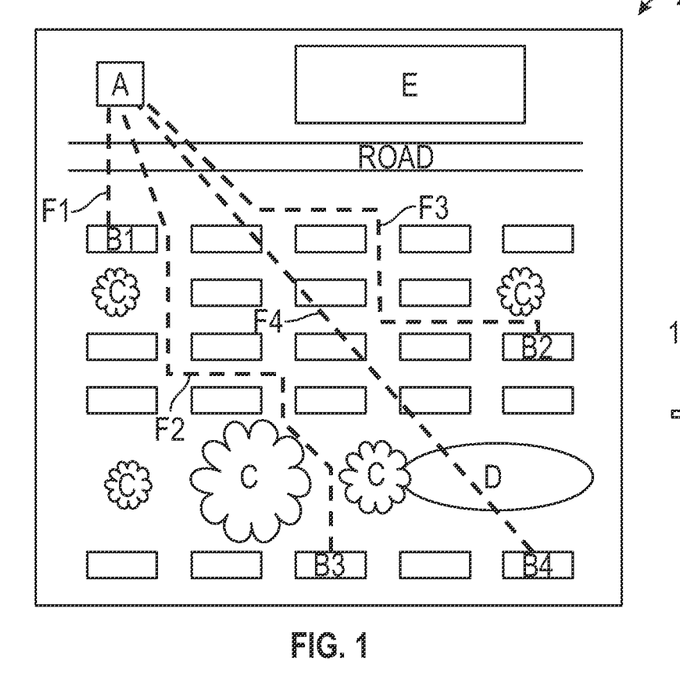
FIG. 1 is a diagram of a cemetery showing various gravesites, a base location for one or more drones, and travel paths for one or more drones.

Referring to FIG. 1, a diagram of the layout of a cemetery 2 is illustrated. As illustrated, the cemetery includes a plurality of gravesites B1, B2, B3 and B4 distributed across the physical land occupied by the cemetery. Also placed within the bounds of the cemetery are various other features and structures like trees C, lake D, and mausoleum E. A base location/base station A is also located on the grounds of the cemetery which houses one or more drones, which may be aerial or ground-based or a combination of both types in various system implementations. Four different travel paths F1, F2, F3, and F4 are illustrated in FIG. 1, each designed to reach gravesites B1, B3, B2, and B4, respectively. Travel paths F2 and F3 illustrate paths that a land-based drone would take to navigate around gravesites and physical obstacles like trees C to reach gravesites B3 and B2. Travel path F4 illustrates a path that an aerial drone could take to travel over various gravesites and avoid trees C while crossing over lake D to reach gravesite B4. Travel path F1 shows a path that could be taken by either a ground-based drone/vehicle or an aerial drone/vehicle to reach gravesite B1. The various travel paths F1, F2, F3, and F4 represent a travel path that takes the drone to the respective gravesite; the travel paths for the return trip back to the base station A for each drone may follow the same path or a different, newly calculated one, depending on the method implementation and whether any new obstacle(s) like visitors, workers, or equipment are now detected in the original travel path or whether another gravesite needs to be visited by the drone prior to returning to base station A (for the same user or a different user). The use of land-based and aerial drones (and even water-based drones in some implementations) can allow drones in the base station A to physically reach every gravesite in a cemetery.

This ability for the drones to reach any gravesite can allow family members and friends who are physically unable to visit the gravesite of a loved one, friend, celebrity, or notable person to visit virtually at their convenience without having to travel to the gravesite. Reasons to visit a gravesite may include spiritual reasons/remembrances/ceremonies, monitoring its upkeep, and other personal reasons that may include marking birthdays, anniversaries, holidays, and other occasions. Many cemeteries are open during certain hours or require on-site staff to be on the grounds during visitations. The use of the drones to do virtual visitation does not require the cemetery to be physically open or have staff on-site for the drone to be utilized because the base station A is already located on the grounds or off-site. For cemeteries that are enclosed by gates or fencing, the drone could fly over the gate/fence to the intended gravesite for the user's visit if the base station is located outside the fencing. This ability for the system to facilitate visitation outside ordinary operating hours of the cemetery means that additional staff do not need to be hired just to facilitate extended visitation hours.

Figure 2:
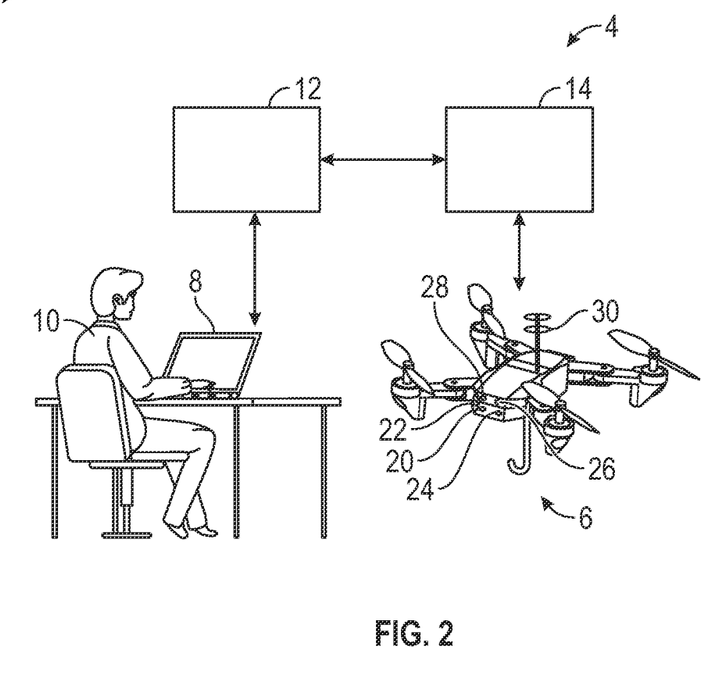
FIG. 2 is a block diagram of various components of a system for facilitating virtual visits to a gravesite.

Referring to FIG. 2, a block diagram of an implementation of a system 4 for facilitating virtual visits to a gravesite using a drone 6 is illustrated. Here the system includes a computing device 8 associated with user 10 who interacts with instructing module 12 which provides instructions to control system 14. Instructing module 12 may include one or more webservers and one or more databases designed to connect with computing device 8 across a telecommunication channel and receive instructions from the user via the computing device 8. In various implementations, the instructing module 12 operates a website or backend service for an application operating on a desktop, laptop, computer, remote control, handheld computer, tablet, smartphone or other device that can send and receive audio and video signals that allows the user to, by non-limiting example, sign up to use the system, provide payment information, apply to get access to a particular gravesite(s) or cemeteries, download software associated with the system, and get help with operating the system. The various one or more databases of the instructing module 12 may store a wide variety of data associated with one or more cemeteries that utilize the system including, by non-limiting example, physical address information, global positioning system (GPS) coordinates of one or more gravesites in each of the one or more cemeteries, images of one or more gravesites in each of the one or more cemeteries, permitted operating hours for drone visitation, permitted weather conditions for drone visitation, off-limits areas, geo-fencing, height limitations within the one or more cemeteries for drone operations, data from the one or more cemeteries, data from third party databases, or any other desired data attribute that enables/affects the virtual visitation capabilities of the drones.

Figure 10:
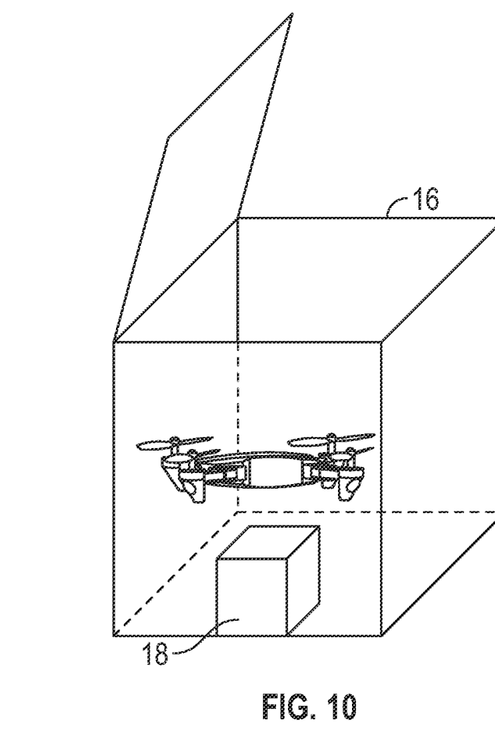
FIG. 10 is a diagram of an implementation of a base location/energy replenishment unit for an aerial or ground-based drone.

Instructing module 12 is in operating communication with control system 14 located at a cemetery using one or more telecommunication channels which may be, by non-limiting example, cellular, satellite, microwave, light, a wired telecommunication channel; a wireless telecommunication channel; a wireless telecommunication channel using the wireless protocol marketed under the tradename WIFI by the WiFI Alliance of Austin, Texas; the internet; a local area network; a wireless telecommunication channel using the wireless protocol marketed under the tradename BLUETOOTH by Bluetooth SIG, Inc. of Kirkland, Washington; a wireless telecommunication channel using the wireless protocol marketed under the tradename ZIGBEE by Connectivity Standards Alliance of Davis, California; or any other wired, wireless, or other electromagnetic wave communication system. The one or more telecommunication channels may also include non-electromagnetic wave communication systems including, by non-limiting example, acoustic, compression wave, or other momentum-transfer communication systems and methods. The control system 14 may be included in at least partly or entirely in the base station/base location and works to operate the drones 6 in response to instructions received from the instructing module 12. Implementations of the control system 14 use navigational drone software and communications technology to communicate and direct the travel path of the drones in combination with software and communications technology included on each of the drones themselves. The base station/base location may be on the cemetery grounds themselves or outside at another location in the vicinity of the cemetery within travel distance of the drones. As illustrated in FIG. 10, the base station 16 includes an energy replenishment apparatus 18 such as, by non-limiting example, a drone battery charging unit, refueling system, plug-in station, docking station, wireless charging station, or any other power transfer station. While the base station 16 in FIG. 10 is illustrated as a box with a lid, a wide variety of base station designs may employed in various implementations. Additional operational characteristics of the control system 14 will be described with respect to the various method implementations disclosed later in this document.

Referring to FIG. 2, the aerial or land-based drones 6 utilized in the implementations disclosed herein may be configured with various sensing devices such as, by non-limiting example, one or more cameras, one or more microphones, one or more speakers, a privacy sensor, a 360-degree privacy sensor, ultrasonic object-detection sensor(s), obstacle avoidance sensors, light sensors, light detection and ranging (LIDAR), or any other desired sensor type. In FIG. 2 and with reference to the larger view in FIG. 3, the particular drone 6 is a quadcopter drone that includes camera 20, microphone 22, and speaker 24 operably coupled with the frame of the drone. In various drone implementations like the drone 6 illustrated in FIG. 2, an illuminating light projecting arrangement such as a spotlight 26 may be incorporated into the drone 6 to illuminate at nighttime or low light conditions a gravesite or portions thereof or surrounding area. This ability to employ illumination may enable a remotely located grieving individual the ability to visit a burial site at night or under other low light conditions when many cemeteries may be closed for public visitation. Other components that may be included in various drone implementations include a projector device 28 designed to display one or more images onto the gravesite. One or more antennas 30 may also be included with the drone to enable communication with the drone 6 with the control system 14 during operation and communication with the various sensor and projection components. Also, the drone 6 illustrates how, in some implementations, a hook 32 or other mechanical device or system may be attached to the aerial drone for carrying physical objects to a gravesite as will be discussed hereafter. The aerial drone implementations may operate autonomously or semi-autonomously depending on the configuration of the control system 14 and the nature of the air space regulations present in the area where the cemetery is located. In autonomous operation, the drone receives a travel path with waypoints to the gravesite, or, in some implementations, just the desired coordinates of the gravesite, and the drone then pilots itself to the gravesite. In semi-autonomous operation, the drone may receive the travel path step-by-step from the control system as the drone indicates each waypoint has been reached until the drone reaches the gravesite. In some implementations where semi-autonomous operation is employed, the drone may have an auto-return function if the drone loses its connection with the base station mid-travel to prevent it from being lost or damaged.

User interaction with the gravesite may include reciting prayers and/or having a conversation with the user's loved one. The ensure privacy, the drone may also include privacy sensors like any disclosed in this document (see FIG. 6, privacy sensor 98, by non-limiting example) such as, by non-limiting example, 360-degree infrared or motion sensors that detect body heat or motion from one or more humans nearby the gravesite within a predetermined distance from the drone. The use of the privacy sensors allows the drone/system to alert the user that their conversation may not be private as one or more humans are within the predetermined distance from the drone.

Figures 3, 4:
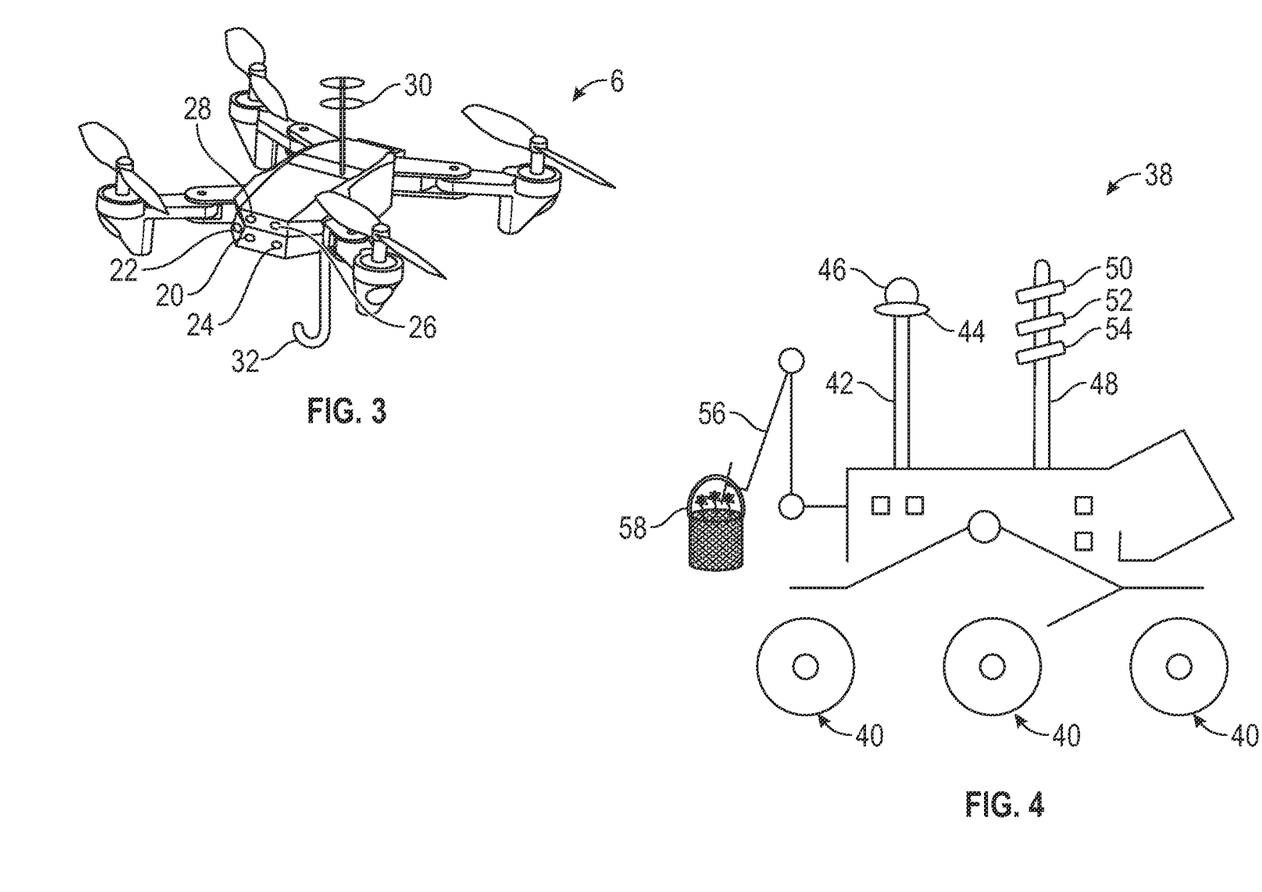
FIG. 3 is a perspective view of an implementation of an aerial drone.
FIG. 4 is a perspective view of an implementation of a ground-based drone with wheels carrying a basket of flowers.

Referring to FIG. 4, an implementation of a land-based drone/vehicle 38 is illustrated. As illustrated this drone 38 includes wheels 40 which are powered to allow the drone 38 to move and traverse the ground autonomously or semi-autonomously under the direction of the control system 14. As illustrated, the drone includes a support 42 for a proximity/privacy sensor 44 and an obstacle avoidance system 46. The obstacle avoidance system may employ, by non-limiting example, ultrasonic sensor(s), cameras, LIDAR (Light Detection and Ranging), any combination thereof, or any other sensor type capable of detecting obstacles in the path of the drone. The various obstacle avoidance systems work to prevent the drones from colliding with people, trees, rocks, and other physical bodies during travel on the ground as in the case of drone 38 or travel in the air as in the case of aerial drone 6.

The drone 38 also includes one or more supports 48 for one or more cameras 50, a projection system 52, and an illumination device 54. The drone also includes an arm or other support 56 (movable or stationary) designed to carry an object (in this case a bouquet of flowers 58 with it to the gravesite. In various system implementations, the object may be manually placed/attached to the support 56 or the drone may retrieve the object on its own at or near the base station or other location where the objects are stored.

Figure 5:
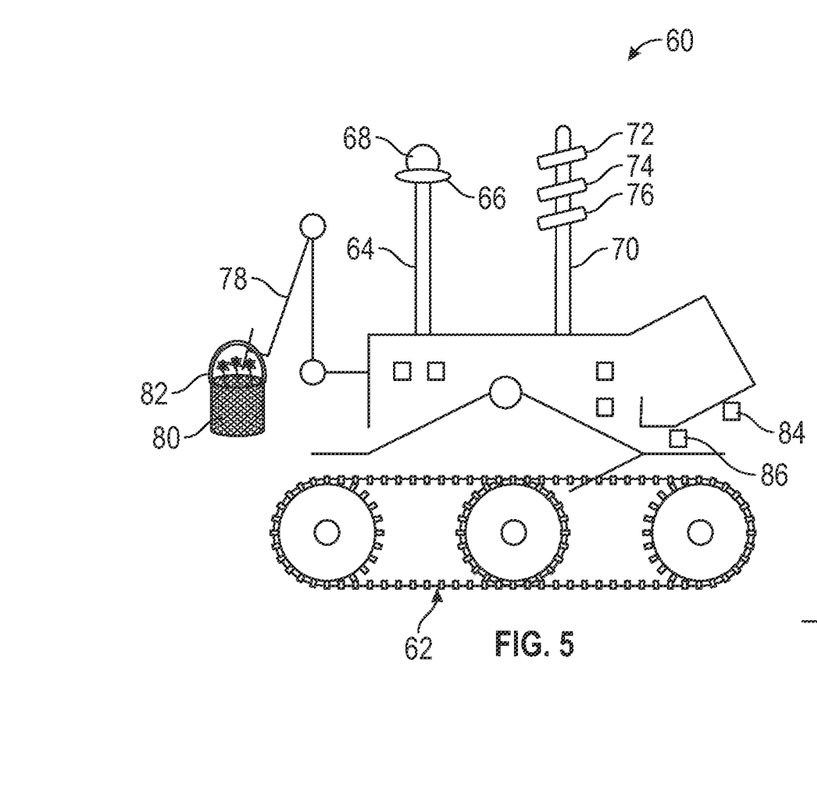
FIG. 5 is a perspective view of another implementation of a ground-based drone with tracks/treads carrying a basket of flowers.

Referring to FIG. 5, another implementation of a land-based drone 60 is illustrated that is similar to the one of FIG. 4 except that instead of independently moving wheels, tracks or treads 62 are used to allow the drone to move across the surface of the ground in the cemetery. Similar to the implementation illustrated in FIG. 4, the drone 60 includes a support 64 for a proximity/privacy sensor 66 and an obstacle avoidance system 68. The obstacle avoidance system 68 may be any disclosed in this document including any LIDAR, acoustic sensor, infrared sensor, camera, or other electromagnetic wave or compression wave-based system. The drone 60 also includes one or more supports 70 for one or more cameras 72, a projection system 74, and an illumination device 76. The drone also includes an arm or other support 78 (movable or stationary) with a container 80 designed to carry an object (in this case a bouquet of flowers 82) with it to the gravesite. This drone includes a microphone 84 and speaker 86 as well.

Figure 6:
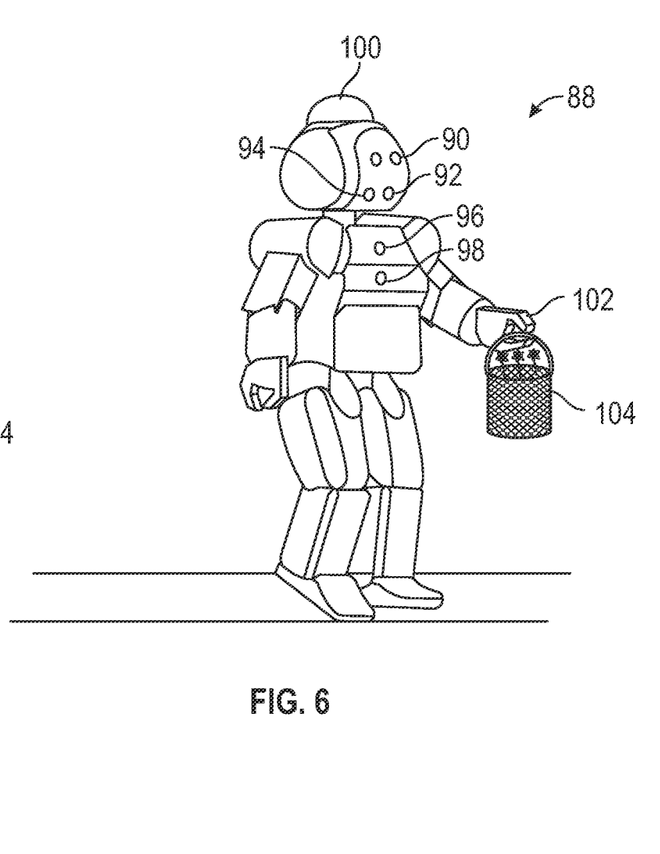
FIG. 6 is a perspective view of another implementation of a ground-based drone carrying a basket of flowers.

Various system implementations may not use just wheeled or tracked land-based drones but may also employ bipedal, quadrupedal, or drones with other numbers of legs or support appendages in various implementations. Referring to FIG. 6, a bipedal drone 88 implementation is illustrated. Similar to the other drone implementations, the drone 88 includes video camera 90, microphone 92, speaker 94, projector system 96, privacy sensor 98, and obstacle avoidance sensor 100, each of which may be and function like any similar sensor or system disclosed in this document. In this drone implementation, the drone includes an arm 102 that contains a coupling system (hand in this case) that allows it to carry container 104 to transport objects to the gravesite.

In various system and method implementations, the drone navigation software of the control system 14 may utilize navigation technologies that utilize, by non-limiting example, physical location, geographical mapping coordinates, GPS, grid pattern, location markers, way points, beacons, image recognition, acoustic wave-based, or any other visual or electromagnetic wave or compression wave employing methods to guide the drone to and from a gravesite. The control system software may use a lookup table or database to retrieve geographic positioning coordinates that correspond to a gravesite of interest that a user has subscribed to or has permission to visit in response to receiving the instruction from the instructing module 12 that the user wishes to visit the gravesite.

Figure 11:
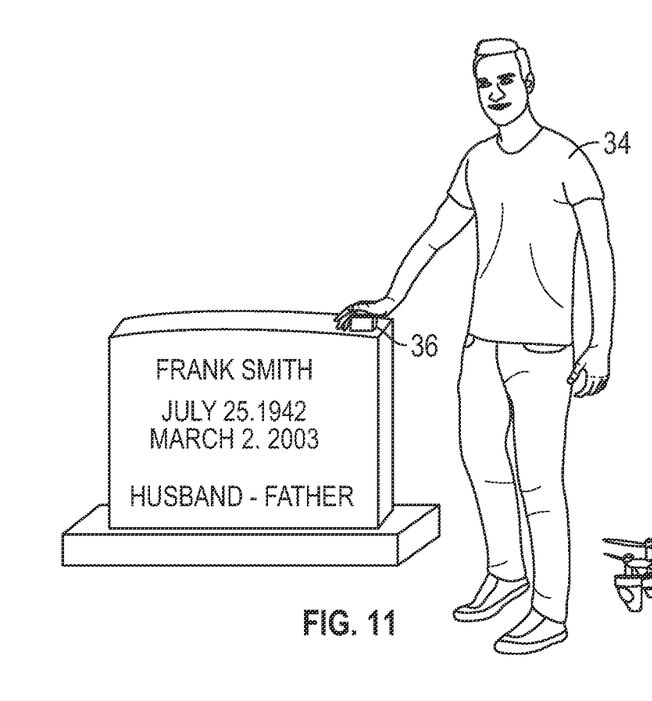
FIG. 11 is a view of a gravesite with a navigation beacon being placed on a headstone by a cemetery worker or other individual.

As part of an implementation of a method of preparing a cemetery for virtual visitation using drones, GPS mapping of some or all of the gravesites in the cemetery may be carried out. The mapping may take place as gravesite virtual visitation requests are received from users or mapping may take place using any other strategy, such as, by non-limiting example, newest gravesites to oldest, section by section, ad hoc, or systematic mapping. In various mapping method implementations, referring to FIG. 11, an individual 34 may momentarily place a GPS receiver device 36 at a specified location for a gravesite (here on top of a headstone located on the gravesite) to obtain/record the GPS location coordinates of that gravesite at the desired level of GPS resolution needed to allow for accurate drone travel to the gravesite. In some method implementations, at the time of recording of the GPS location coordinates, corresponding details of the associated deceased individual interred at the gravesite, such as, by non-limiting example, the name of the deceased as is typically found on a grave marker or register at the cemetery, may be recorded for storage in a database of the instructing module 12 along with the GPS location coordinates. This ability to link GPS location coordinates with a person's name at a given cemetery may allow a grieving individual to simply look up a deceased person's name using a computing interface generated by the computing device 8 in communication with the instructing module 12 to retrieve from the database the deceased individual's associated GPS location coordinates. These coordinates can then be provided to the control system by the instructing module 12 and used by the navigational software to calculate a travel path for a drone to the desired gravesite. The starting point of the travel path begins where the drone is currently located (i.e., another gravesite, the base station, or another intermediate location) to the desired location of the gravesite. The use of GPS location coordinates for navigation does not involve any electronic equipment or anything else to be pre-positioned or permanently installed or mounted at a burial site as a prerequisite for a grieved individual to remotely visit a deceased loved one. In other words, a grieving individual may remotely and spontaneously visit a deceased individual without the need for the burial site to be preconfigured with any installed electronic hardware. This is similar to the traditional method of visiting a local gravesite "on-the-fly" or "on the spur of the moment" without requiring any preparation work with the cemetery.

Figure 12:
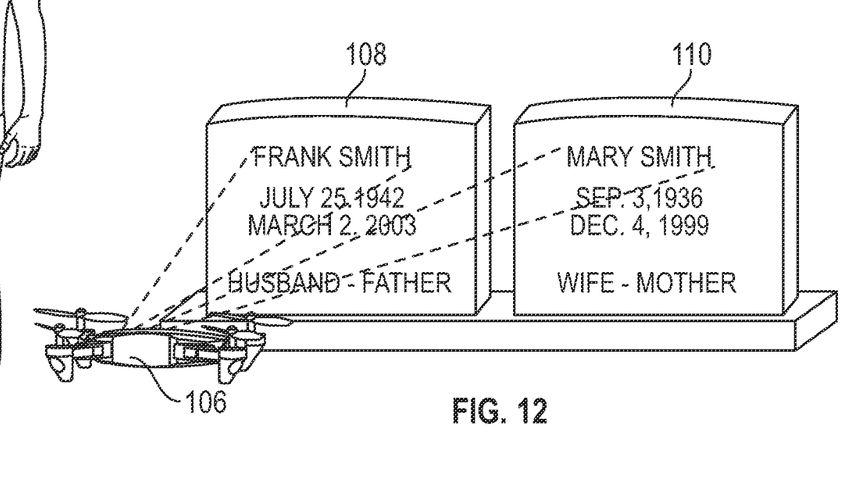
FIG. 12 is a perspective view of a gravesite with an aerial drone performing image recognition of two adjacent headstones.

In other mapping method implementations, in conjunction with GPS coordinate mapping or instead of GPS coordinate mapping, the use of grave stone image recognition may be employed. As used herein, the term "grave stone" refers to any object used to identify the location of and/or identity of a person interred at a gravesite; it thus includes the terms "grave marker" and "grave monument." In implementations where grave stone image recognition is employed, the use of the drones themselves to acquire images of grave stones and process or send for processing the images for data extraction may be used. A non-limiting example of a computer vision application that could be utilized in a method implementation includes the machine vision library marketed under the tradename OPENCV by the Open Source Vision Foundation. Other machine vision systems, libraries, and methods could also be employed in various implementations. FIG. 12 illustrates a drone 106 taking images of grave stones 108, 110. Here, as illustrated by the dotted sight lines, the drone 106 includes two cameras to enable taking images in a wider field of view for faster image acquisition. After the drone takes one or more images of the grave stone(s), the physical characteristics such as, but not limited to, size, shape, material, color, imprinted/engraved text and images is noted, processed, and stored in the database to create a record of the visually unique and distinguishable characteristics of the grave stone that set it apart from each other grave stones in the cemetery.

Whether by use of drone data collection as in FIG. 12, or by manual use of a digital camera, at least one photograph is taken of at least the content (often front) surface of some or all grave stones in a cemetery. Each digital image along with the corresponding details of the associated deceased individual (i.e., the name of deceased as is typically found on the content/front side of a grave marker) is then recorded into a database associated with the instructing module 12. This information, in combination with the creation of a relational map of each grave stone in a cemetery using a map or with respect to another coordinate system, allows for the unique positioning of each grave stone in relation to all other grave stones in the cemetery. With the relational map and grave stone images stored in the database, a grieving individual may simply look up a deceased person's name using a computer interface of computing device 8 to retrieve from the database the associated unique grave stone image(s) and then instruct a drone to navigate to the desired grave stone. In various method implementations where digital images are employed, some implementations may utilize way points and travel path calculations like those previously discussed where the relational map data and grave stone data are employed instead of using GPS coordinate information. In other implementations, as the drone travels, the drone is continuously accessing its location by viewing grave stone digital images in its surroundings and comparing these with stored images of grave stones. This information, coupled with the above referenced pre-determined relational location map of grave stones in a cemetery, enables the drone to move towards the direction of a desired gravesite and to confirm when it arrives by again using image comparison. This method of navigation and the corresponding image-based method of cemetery mapping also does not involve installing any electronic equipment or anything else to be installed at a gravesite or elsewhere to allow for a grieved individual to remotely visit their deceased loved one.

Figure 8:
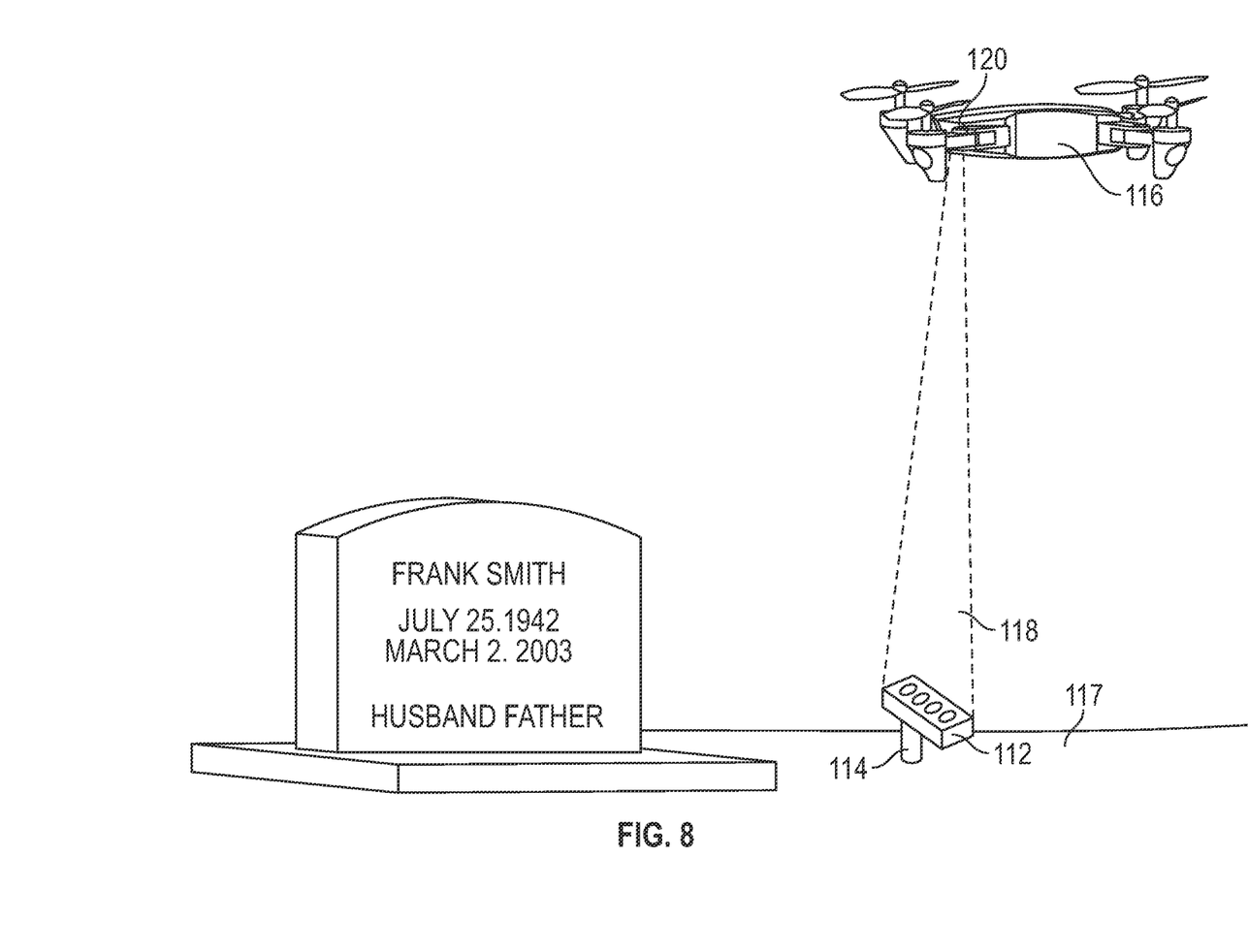
FIG. 8 is a perspective view of an aerial drone at a gravesite using a navigation beacon.

The various methods of drone navigation previously disclosed may be augmented with auxiliary navigational aids in various situations. Referring to FIG. 8, in the case of GPS navigation, if GPS satellite signal reception is unreliable or becomes unreliable at a cemetery, then a navigational aid(s) such as, by non-limiting example, a homing beacon(s) 112 may be pre-positioned at or near a gravesite or elsewhere in various location(s) in the cemetery. Such a beacon(s) may simply be appended to the top end of a rod or stake 114 and may face skyward for use with an aerial drone 116. The bottom end of the rod or stake 114 is hammered or otherwise inserted into the ground 117. Such a beacon(s) may be installed and removed quickly and be present either temporarily or permanently. One type of such a beacon emits a unique light pattern 118 which may be detected overhead by the camera 120 of an aerial drone 116 and used to guide the drone towards the beacon allowing the drone to locate its position and move appropriately toward the base station or gravesite. In the case of image recognition-based navigation, such a beacon(s) or other navigation aid(s) may be appropriate in situations such as, but not limited to, where a cemetery has frequent low visibility due to persistent conditions such as fog or rain which may impact grave stone clear image capture from a drone camera. In the various methods of drone navigation, geofencing and/or height limitations may be employed to ensure that the various drones do not cross specific boundaries of the cemetery or rise above predetermined or regulatory height thresholds.

In the various system and method implementations disclosed herein, when the drone reaches the intended gravesite, the onboard camera, microphone, and speaker device are automatically or remotely activated and communicate video and/or audio signals with the user's computing device 8. The camera provides images and the microphone picks up ambient sounds around the gravesite and the drone communicates the images and audio over a telecommunications channel to the base station which then relays the images and audio to the instructing module 12. The instructing module 12 then sends the images and audio to the computing system 8 associated with the user 10 who then uses a computer interface on the computing system 8 to view the images and listen to the audio. In a similar way, the onboard speaker device allows the user to be heard at the gravesite when speaking into a microphone associated with the computing device so the user may interact with the gravesite to recite prayers or have a conversation with their loved one, friend or acquaintance, just as if they were visiting in person. The various privacy sensor implementations previously disclosed may also be used to sense the presence of one or more humans within a predetermined distance from the drone and alert the user if one or more humans are detected. This will allow the user to tune the speaker volume as described hereafter to ensure what is being spoken is not overheard.

Figure 9:
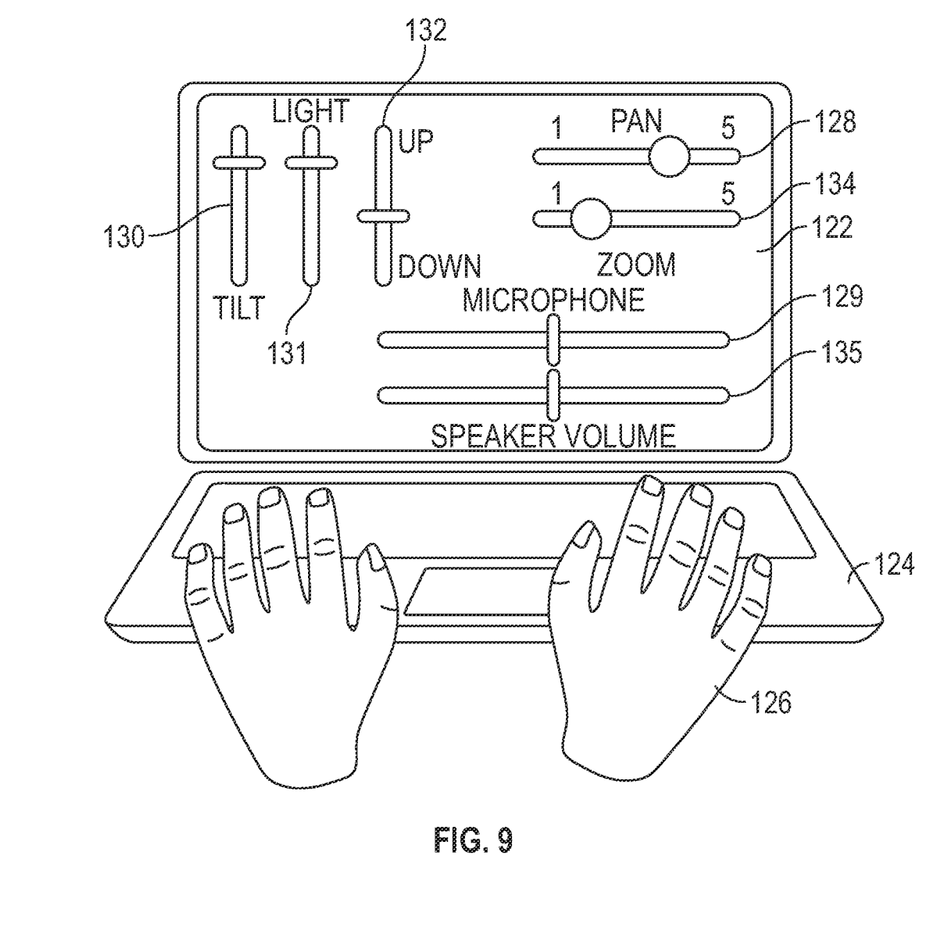
FIG. 9 is a front view of an implementation of a computing device associated with a user showing an implementation of a control computing interface thereon.

Although in various system and method implementations, the complete operation of the drones may be programmed to be automatic and not require any intervention by the grieving user or others, the user may also be provided the ability to control certain aspects of their visit to the gravesite. Referring to FIG. 9, an implementation of a computer interface 122 generated by computing device 124 associated with user 126 is illustrated. As illustrated, the computer interface 122 includes various controls for camera and speaker functions, including, by non-limiting example, controlling the positioning/pointing of the angle of camera towards the gravesite or surrounding areas (up/down 132) and controlling other aspects of the camera operation such as panning 128, tilting 130, zooming 134 or any other desired camera position adjustment. Similarly, the user may control the sound level of the audio speakers 135, the intensity of the projecting light sources 131, and/or the adjustment of the gain of the microphone 129. In some implementations, the user may also be able to input commands that adjust the position of the drone either among a set of fixed positions relative to the gravesite or a set of continuous positions within limits relative to the gravesite (height, angle, position to grave stone, etc.).

The ability to control such features remotely using the interface of FIG. 9 enables the user to more realistically simulate an actual in-person experience at a gravesite. For example, if the privacy sensor (which may be any disclosed in this document) detects nearby mourners or other persons, the remote user of this system may lower the output volume of the speaker illustrated such that the user may speak towards the gravesite in a whispering volume similar to the sound level they would project to a gravesite in person when other mourners/persons are nearby. The computer interface 122 enables a user to control such functions by manipulating scroll-bars or other icons to control the various functions.

While the drone is present at the gravesite after being navigated thereto, the user is able to have an interactive audiovisual experience with the gravesite at their convenience. The video camera provides images of the grave stone, monument, flowers, or other aspects of the gravesite. This same function exists even where the gravesite is a crypt, inside a mausoleum, or inside a columbarium provided the drone is able to navigate into the building. The microphone captures sounds that may include birds, water features, or other mourners visiting the gravesite which are the same sounds that a person may hear when visiting a gravesite in person. The ability to visit virtually via drone may be coordinated with other mourners, allowing the virtual user to participate with those mourners at a gravesite in person. In various system or method implementations, when arriving at the gravesite, the onboard video camera, microphone, and audio speaker device may be automatically activated or may be remotely activated by the user when ready.

Figure 7:
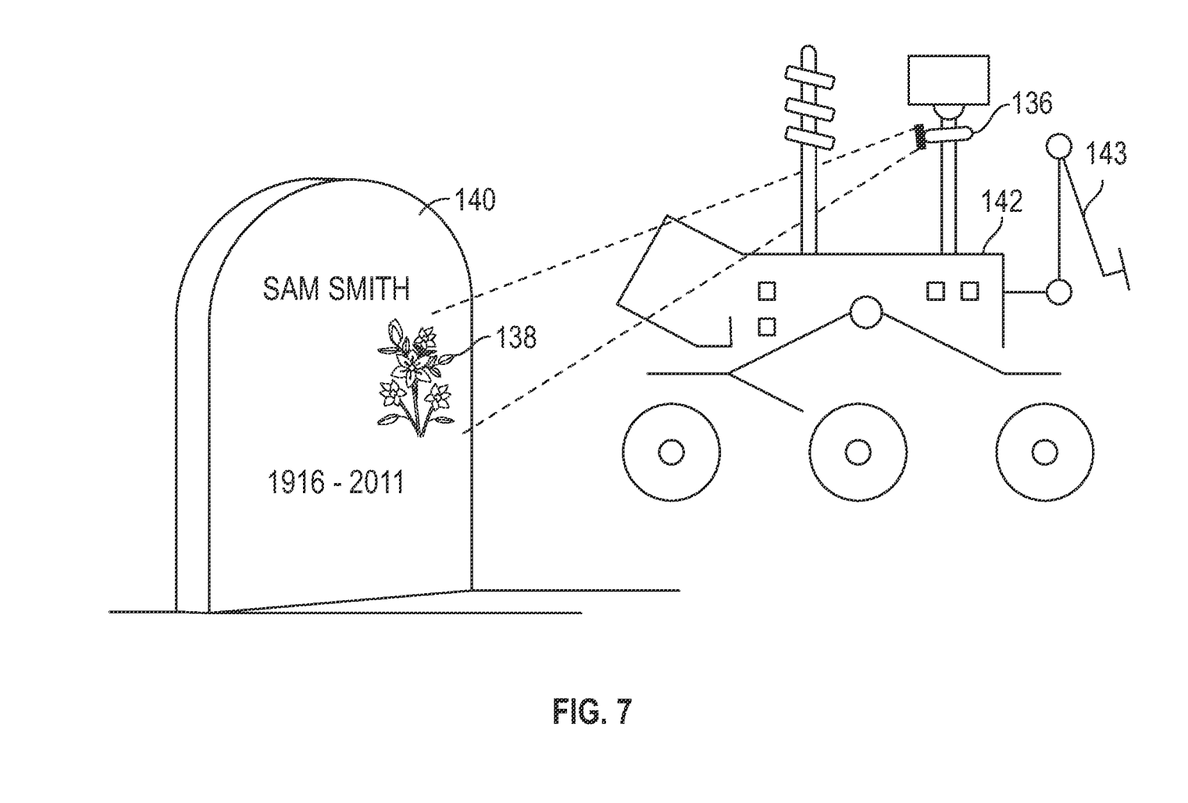
FIG. 7 is a perspective view of an implementation of a ground-based drone at a gravesite using a projector device.

Referring to FIG. 7, the onboard projector 136 may also be activated during a gravesite visit either by the user or automatically so that the user may view virtual flowers 138 on or near the grave stone 140 at the gravesite. The onboard projector 136 may also project flowers or other images onto or at, by non-limiting example, the gravesite, monument or ground that the user is viewing. The projection unit 136 may use non-holographic, holographic, laser, diffuse light, or other projection systems and methods to carry out the projection. The drone 142 may also have the ability to deliver physical flowers during the visit and/or other items of remembrance to the gravesite using drone delivery technologies and methods disclosed in this document like arm 143.

When the visit is complete, the drone may communicate with the control system 14 to indicate the user is finished (or the user's time is up or time has expired due to battery life limitations, etc.). The control system 14 may then, in various system implementations, calculate a return travel path and communicate that to the drone, the drone may autonomously calculate a return travel path, or the drone may simply retrace its original steps back to the base station following the reverse of the original travel path. If another user is ready for a virtual visit however, the control system 14 may direct the drone by sending it a path to the next gravesite or may simply send the coordinates/image of the next gravesite and the drone may then plot a new course to the gravesite.

Figure 13:
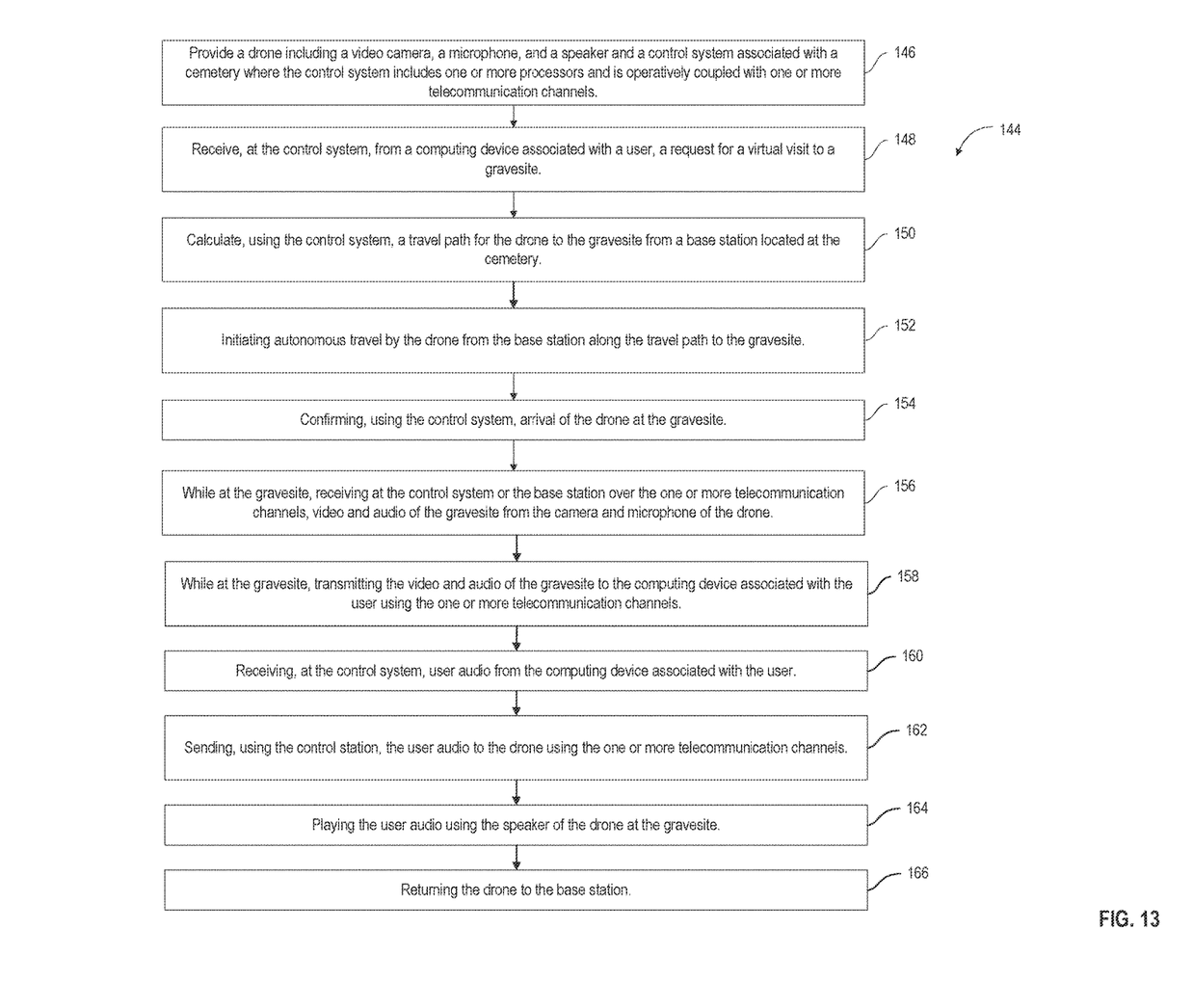
FIG. 13 is a flowchart of an implementation of a method of facilitating a virtual visit to a gravesite.

The various system implementations disclosed herein may utilize/enable various methods of facilitating a virtual visit to a gravesite. Referring to FIG. 13, a flowchart of a method implementation is illustrated. As illustrated, the method includes providing a drone including a video camera, a microphone, and a speaker along with a control system associated with a cemetery where the control system includes one or more processors and is operatively coupled with one or more telecommunication channels (step 146). The drones used in the various method implementations may be any aerial, land-based, or water-based ones disclosed in this document. The method also includes receiving, at the control system, from a computing device associated with a user, a request for a virtual visit to a gravesite (step 148). The computing device may be any disclosed in this document, including, by non-limiting example, a laptop, a desktop, a server, a smart phone, a tablet, or any other fixed or portable computing device capable of displaying, playing, and transmitting audio and video. The method also includes calculating, using the control system, a travel path for the drone to the gravesite from a base station located at the cemetery (step 150) and initiating autonomous travel by the drone from the base station along the travel path to the gravesite (step 152). The use of autonomous travel may significantly reduce the labor costs associated with manual driving of the drones and aid in allowing for the system to have multiple drones out and returning at a time for a given cemetery. The method also includes confirming, using the control system, the arrival of the drone at the gravesite (step 154). The confirmation may come to the control system from the drone itself or the control system may independently monitor the position of the drone using a GPS position tracking system installed on the drone, by non-limiting example.

The method also includes, while at the gravesite, receiving at the control system or the base station over the one or more telecommunication channels, video, and audio of the gravesite from the camera and microphone of/associated with the drone (step 156). The method includes, while at the gravesite, transmitting the video and audio of the gravesite to the computing device associated with the user using the one or more telecommunication channels (step 158). The method also includes receiving, at the control system, user audio from the computing device associated with the user (step 160) and sending, using the control station, the user audio to the drone using the one or more telecommunication channels (step 162). The method also includes playing the user audio using the speaker of the drone at the gravesite (step 164) and returning the drone to the base station (step 166).

In places where the description above refers to particular implementations of systems and methods for facilitating a virtual visit to a gravesite and implementing components, sub-components, methods and sub-methods, it should be readily apparent that a number of modifications may be made without departing from the spirit thereof and that these implementations, implementing components, sub-components, methods and sub-methods may be applied to other systems and methods for facilitating a virtual visit to a gravesite.

What is claimed is:

1. A system for facilitating a virtual visit to a gravesite comprising:
   a drone comprising a video camera, a microphone, and a speaker;
   a control system associated with a cemetery, the control system comprising one or more processors and a telecommunication channel configured to:
      receive, from a computing device associated with a user, a request for a virtual visit to a gravesite;
      calculate a travel path for the drone to the gravesite from one of a base location located at the cemetery or a current drone location;
      initiate autonomous travel by the drone along the path to the gravesite;
      confirm arrival of the drone at the gravesite;
      while at the gravesite, transmit video and audio of the gravesite from the camera and microphone of the drone to the computing device associated with the user using the telecommunication channel;
      while at the gravesite, transmit audio from the computing device associated with the user from the speaker of the drone; and
      return the drone to the base location,
   wherein said calculation of a travel path to a gravesite is conducted by at least one navigational system combined with details of the deceased individual interred at the gravesite.

2. The system of claim 1, wherein the drone is one of an aerial vehicle or a land vehicle, and said details of the deceased individual may be selected from the name on the grave marker or grave registry, an image of the respective grave marker, or both.

3. The system of claim 1, wherein the drone further comprises a projector device configured to display one or more images onto the gravesite.

4. The system of claim 1, wherein the drone further comprises an illumination device configured to illuminate the gravesite.

5. The system of claim 1, wherein the drone further comprises a privacy sensor configured to detect the presence of another human within a predetermined area around the gravesite.

6. The system of claim 1, wherein the control system and computing device associated with the user are configured to allow the user to adjust a position of the drone relative to the gravesite after arrival of the drone at the gravesite.

7. The system of claim 1, wherein the drone comprises a grave stone image recognition system comprising at least one camera configured to receive and process images of one or more gravestones at the gravesite or cemetery.

8. The system of claim 1, wherein said navigational system comprises a global positioning sensor, and, an additional navigation system selected from one of a geofencing sensor, a height sensor, a homing sensor detector, an image recognition sensor, or any combination thereof.

9. The system of claim 1, wherein the drone comprises a transporting module configured to transport an object to the gravesite during autonomous travel and leave the object at the gravesite after arrival at the gravesite.

10. The system of claim 1, wherein the drone further comprises an obstacle avoidance sensor.

11. A system for facilitating a virtual visit to a gravesite comprising:
    one of an aerial drone or a land-based drone, the aerial drone or land-based drone comprising a video camera, a microphone, a speaker, and a global positioning sensor; and
    a base station comprising a control system, the control system comprising one or more processors configured to use one or more telecommunications channels to:
       receive, from a computing device associated with a user, a request for a virtual visit to a gravesite;
       calculate a travel path for the aerial drone or land-based drone to the gravesite from a base location;
       initiate autonomous travel by the aerial drone or land-based drone along the travel path to the gravesite;
       confirm arrival of the aerial drone or land-based drone at the gravesite using the global positioning sensor;
       while at the gravesite, transmit video and audio of the gravesite from the camera and microphone of the aerial drone or land-based drone to the computing device associated with the user using the telecommunication channel;
       while at the gravesite, transmit audio from the computing device associated with the user from the speaker of the aerial drone or land-based drone;
       avoid obstacles at the gravesite and during the travel path using the obstacle avoidance sensor;
       provide a transporting module configured to transport an object to the gravesite during autonomous travel and leave the object at the gravesite after arrival at the gravesite;
       and
    return the aerial drone or land-based drone to the base location,
    wherein said step of calculating a travel path is conducted by global positioning system mapping of a gravesite combined with details of the deceased individual interred at the gravesite.

12. The system of claim 11, wherein the aerial drone or land-based drone further comprises a projector device configured to display one or more images onto the gravesite.

13. The system of claim 11, wherein the aerial drone or land-based drone further comprises an illumination device configured to illuminate the gravesite.

14. The system of claim 13 wherein at least one of said video camera, and said microphone, speaker, and illumination device are adjustable.

15. The system of claim 11, wherein the aerial drone or land-based drone further comprises a privacy sensor configured to detect the presence of another human within a predetermined area around the gravesite.

16. The system of claim 11, wherein the control system and computing device associated with the user are configured to allow the user to adjust a position of the aerial drone or land-based drone relative to the gravesite after arrival of the aerial drone or land-based drone at the gravesite.

17. The system of claim 11, wherein the aerial drone or land-based drone comprises a grave stone image recognition system comprising at least one camera configured to receive and process images of one or more gravestones at the gravesite or cemetery.

18. A method for facilitating a virtual visit to a gravesite comprising:
providing a drone comprising a video camera, a microphone, and a speaker and a control system associated with a cemetery, the control system comprising one or more processors and is operatively coupled with one or more telecommunication channels;
receiving, at the control system, from a computing device associated with a user, a request for a virtual visit to a gravesite;
calculating, using the control system and details of a deceased individual of the gravesite, a travel path for the drone to the gravesite from a base station or other location;
initiating autonomous travel by the drone from the base station or other location along the travel path to the gravesite;
confirming, using the control system, arrival of the drone at the gravesite;
while at the gravesite, receiving at one of the base station or the control system over the one or more telecommunication channels, video and audio of the gravesite from the camera and microphone of the drone;
while at the gravesite, transmitting the video and audio of the gravesite to the computing device associated with the user using the one or more telecommunication channels;
receiving, at the control system, user audio from the computing device associated with the user;
sending, using the control station, the user audio to the drone using the one or more telecommunication channels;
playing the user audio using the speaker of the drone at the gravesite; and
returning the drone to the base station.

19. The method of claim 18, wherein returning the drone to the base station further comprises:
using the control system to calculate a travel path for the drone from the gravesite to another site or the base station; and
initiating autonomous travel by the drone to the base station along the travel path from the gravesite.

20. The method of claim 18, further comprising projecting an image on the gravesite using a projector device comprised in the drone.

21. The method of claim 18, further comprising detecting, using a privacy sensor comprised in the drone, a presence of a human within a predetermined area around the gravesite.

22. A system for facilitating a virtual visit to a gravesite comprising:
a drone comprising a video camera, a microphone, a transport module, and a speaker;
a control system associated with a cemetery, the control system comprising one or more processors and a telecommunication channel configured to:
receive, from a computing device associated with a user, a request for a virtual visit to a gravesite;
calculate a travel path for the drone to the gravesite from one of a base location located at the cemetery or a current drone location;
initiate autonomous travel by the drone along the path to the gravesite;
confirm arrival of the drone at the gravesite;
while at the gravesite, transmit video and audio of the gravesite from the camera and microphone of the drone to the computing device associated with the user using the telecommunication channel;
while at the gravesite, transmit audio from the computing device associated with the user from the speaker of the drone;
transport an object to the gravesite during autonomous travel and leave the object at the gravesite after arrival at the gravesite;
and
return the drone to the base location.

* * * * *